United States Patent [19]

Vackier et al.

[11] 4,244,645
[45] Jan. 13, 1981

[54] DAYLIGHT LOADING SYSTEM FOR MICROFICHE CASSETTES

[75] Inventors: Leo N. Vackier, 'S-Gravenwezel; Lucien P. Van der Vliet, Hoboken; Roger J. Bals, Schelle, all of Belgium

[73] Assignee: AGFA-GEVAERT N.V., Mortsel, Belgium

[21] Appl. No.: 30,564

[22] Filed: Apr. 16, 1979

[30] Foreign Application Priority Data

Apr. 18, 1978 [GB] United Kingdom .............. 15241/78

[51] Int. Cl.³ ...................... G03D 13/06; G03B 17/26
[52] U.S. Cl. ..................................... 354/310; 354/276
[58] Field of Search ...................... 355/21, 27, 72, 73; 354/83, 276, 283, 307–310

[56] References Cited
U.S. PATENT DOCUMENTS 1,929,508  10/1933  Meyer et al. ...................... 354/309
2,900,514  8/1959   Boucher ........................... 354/276 X
4,053,219  10/1977  Damm et al. ......................... 355/27

FOREIGN PATENT DOCUMENTS

523289  4/1921  France ........................... 354/83

Primary Examiner—Donald A. Griffin
Attorney, Agent, or Firm—William J. Daniel

[57] ABSTRACT

A daylight loading device (40) for loading a microfiche cassette (10) with unexposed microfiches makes use of an inclined platform (50) having guides (51) and (52) upon which the microfiche cassette (10) may be positioned. Microfiches are fed from an adjacently positioned dispensing station (43) via a slot (46) and a transport roller pair. In order to provide for an optimum registering of the microfiche in the bottom of the microfiche cassette (10) a spadelike element (55) is temporarily positioned near the latter. A mechanism is provided for re-locking the microfiche cassette (10) after loading.

10 Claims, 9 Drawing Figures

DAYLIGHT LOADING SYSTEM FOR MICROFICHE CASSETTES

The present invention is concerned with microfiche systems. More particularly, it is concerned with a system by means of which a microfiche cassette can be loaded with unexposed microfiches in an illuminated room.

In contradistinction to microfilms which are provided on a so-called daylight reel, microfiches are in the form of separate sheets having the dimensions approximating those of a postcard. A plurality of these sheets are packed together and in order to load one of them into a microfiche camera, installed in a well-lit room, it has to be put in an appropriate cassette which screens off the ambient light during the transfer from the loading station (normally a darkroom) to the place where exposures are carried out and vice versa.

In order to dispense with the use of a darkroom, which in the microfiche field is only part-time used, systems have been devised for unloading and loading a microfiche cassette in well-lit conditions.

Such a loading/unloading device is disclosed in the German Pat. No. 2,544,818 filed Oct. 3, 1975 by A. Jacknau. This disclosure deals with a table top model loading/unloading device in which three compartments are provided, namely one compartment for storing unexposed microfiche sheets, one for the storage of exposed microfiche sheets and one in which the microfiche cassette may be located. The interior of the device can be reached by hand via a light impervious, loosely hanging sleeve which is tapered and through which an operator may carry out manipulations such as unloading a cassette, taking an unexposed microfiche sheet from a stack of such sheets and putting it into the emptied cassette. The latter is taken out of the device whereupon it is ready for a subsequent exposure cycle.

It will be clear that this way of handling microfiche sheets requires a considerable amount of skill and attention from the part of the operator and that the chance of making mistakes is not excluded.

It is therefore an object of the invention to provide a device for separately loading microfiche cassettes so that the risk for intermixing unexposed and exposed microfiches is avoided. Moreover, the invention provides for a device for automatically loading microfiche cassettes in daylight conditions.

A separate unloading device is disclosed in our copending application No. 30,530 filed on even data herewith for "Daylight Unloading System for Microfiche Cassettes" claiming the priority of British Patent Application No. 15242/78, filed Apr. 18, 1978 by Agfa-Gevaert N.V.

A microfiche cassette unit, the description of which follows hereinafter, will be called "a microfiche cassette of the type referred to".

According to the invention, there is provided:

A device for loading a microfiche cassette of the type referred to in daylight conditions, comprising a housing, a door capable of light-tightly screening off light from the interior of the housing, a space in which a stack of unexposed microfiches may be housed in darkroom conditions, a platform for positioning the microfiche cassette in the housing in unlocked and opened condition, means to take hold of the uppermost one of the stack of unexposed microfiches and to forward the latter towards the opened cassette, means to form a temporary guide for the microfiche in the course of being forwarded so that the latter goes to a predetermined position in the microfiche cassette, preferably in the bottom thereof, and means for the closing and the relocking of the microfiche cassette after withdrawal of said temporary guide.

Preferably, the cassette is introduced in the device in inclined position whereafter it is opened by hand and the door closed.

The means forming the temporary guide may comprise a pivotable spade-like element having the approximate dimensions of the bottom of the microfiche cassette and which is positioned parallel with the bottom at a distance of for example 1 to 3 and preferably about two millimeters. Moreover, another resiliently biased element may be located at the other side of the bottom and also in parallel relation therewith so that a small gap is formed through which the microfiche being dispensed is guided into a groove peripherally extending around the bottom.

The guides may be actuated by hand or by means of an electric motor.

After loading the cassette may be closed and locked by a mechanism imparting a mechanical impulse to the cover, the latter performing a pivoting motion on the cassette hinges. By adequately choosing the magnitude of the mechanical impulse, the latter may be sufficiently high to impart a momentum to the cassette cover which suffices for forcing the locks of the locking mechanism to snap into their corresponding holes, in this way relocking the microfiche cassette.

The microfiches are stored in a light-tight compartment in the housing which is provided with an exit opening via which the microfiches are dispensed. The exit opening, in periods of non-use, is provided with a displaceable light trap, so that in periods of non-use, or when the door of the housing is open, accidental exposure is completely prevented.

The mechanism for taking the uppermost microfiche of the stack is of rather conventional design in that it incorporates a suction member which is cam-operated and which performs a cycle of movements enabling a microfiche to be taken hold of and dispensed without risk of scratches, static electrification, etc. in this way avoiding phenomena and manipulations which would impair the quality of the light-sensitive surface coated on the microfiche. Supplementary expedients may be provided which avoid the risk of dispensing more than one microfiche at the same time.

The microfiche dispensing station may additionally be equipped with means which assure a correct aligning of the stack in order to avoid that any misalignment, which e.g. occurs when a microfiche would fall off the sucker cup, is automatically corrected.

The scope and spirit of the invention will be better understood through a description of a preferred embodiment and in the light of the accompanying drawings, in which:

FIG. 1 is an illustration of a microfiche cassette unit of the type referred to.

Figure 1:
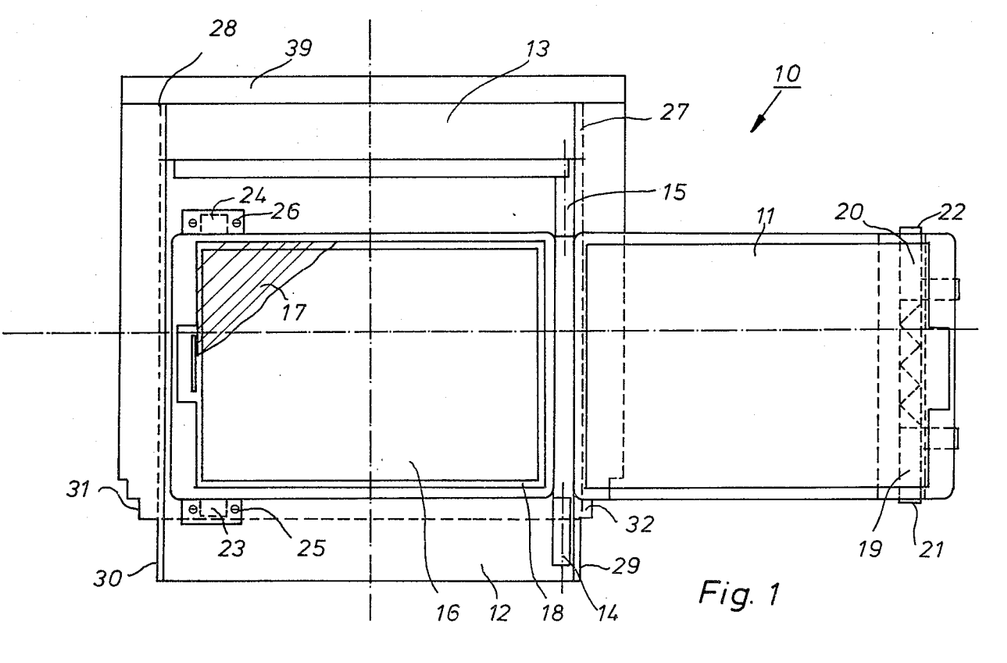

FIG. 1 illustrates a microfiche cassette unit 10 of the type referred to used in combination with the microfiche cassette loading device according to the invention. The microfiche cassette unit itself forms no part of the invention but is illustrated in order to facilitate a description of the working principle of the loading device and to facilitate the understanding of the particular problems arising from the nonconventional structure of the microfiche cassette in.

As the latter is composed of more elements than merely a cover and a bottom, it will be called "a microfiche cassette unit of the type referred to".

The microfiche cassette unit 10 is composed of a cover 11, a bottom 12 and a screen 13. The cover and the bottom are hingedly connected to each other by means of a pair of hinges 14 and 15.

In the bottom 12 an opening 16 is provided having the approximate dimensions of a microfiche 17 (only a part of the latter being shown by an hatched area). Microfiche 17 rests with its edges in groove 18 provided in bottom 12 along the whole periphery of opening 16. When in closed condition, the cover 11 is substantially coincident with the surface defined by the upper surface of groove 18 in opening 16.

The cover 11 and the bottom 12 are locked together by means of spring-biased locks 19 and 20 whose protruding portions 21 and 22 respectively mate with corresponding openings 23 and 24 in the bottom 12, which openings are provided in members 25 and 26 respectively, fixedly secured to the bottom 12.

In order to protect the microfiche 17 from exposure to ambient light (through opening 16 in the cassette) a supplementary screen 13 is provided during transport from the loading station, to the exposure station such as a microfiche camera (not shown), and again from the exposure station to the unloading station.

The screen is provided on its side edges with guides 27 and 28 in which the side edges 29,30 of the bottom 12 may freely move. An abutment member 39 is provided at the trailing edge of the screen 13 so that the set, formed by the cover 11 and the bottom 12 is allowed to perform a sliding movement into and out of the screen 13. Once in the camera, the screen 13 is removed from the rest of the microfiche cassette unit 10 so that the microfiche 17 contained therein may be exposed through opening 16.

For the purpose of facilitating a reproducible positioning of the microfiche cassette unit 10 in the camera, the screen 13 is also provided with profiles 31 and 32 at its leading edge which mate with and are arrested by corresponding profiles (not shown) at the camera when the bottom 12 and the cover 11 are slid into the camera in locked condition. The camera then becomes ready for exposure.

After exposure, the reverse action takes place, in that, after positioning the screen 13 to close opening 16 again, the set formed by the cover 11 and the bottom 12, locked together, and containing an exposed microfiche 17, is withdrawn from the camera, in telescoping relation in the screen 13 and subsequently transported to an unloading station in a light-tight condition. With the unloading station may be associated intermediate storage facilities or a microfiche processing apparatus.

Figure 2:
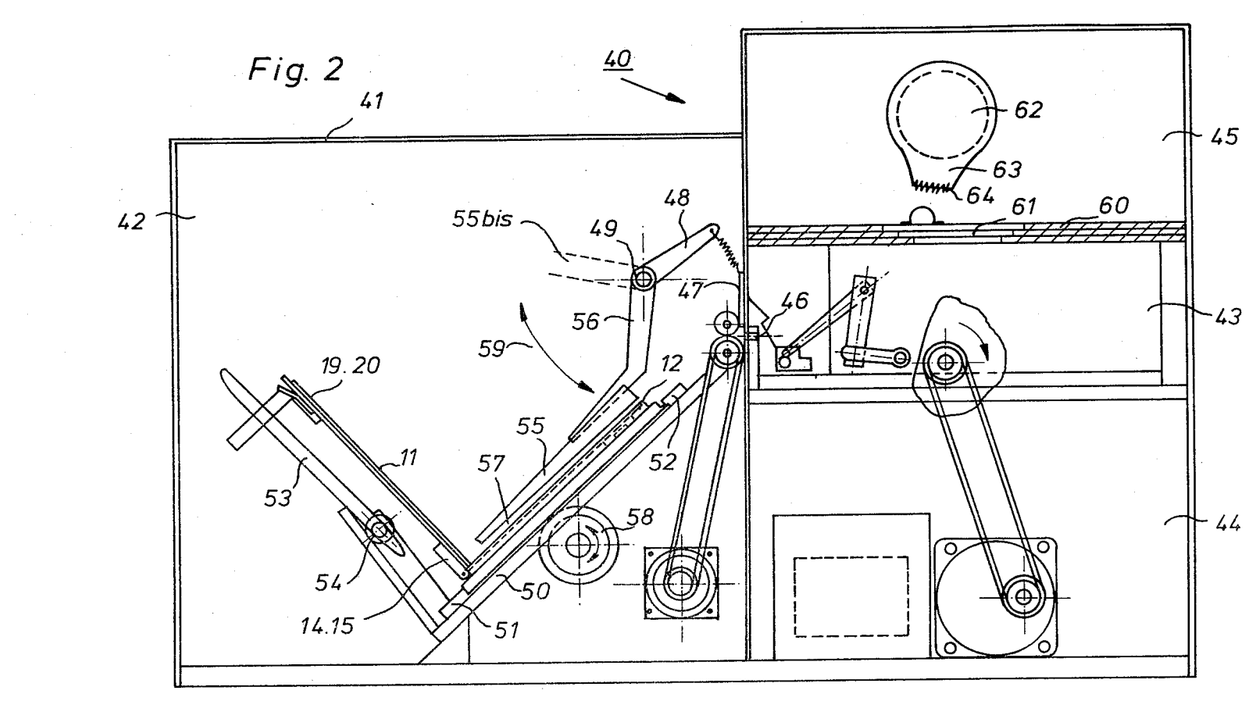
FIG. 2 shows a cross-sectional view of the loading device.

FIG. 2 shows a microfiche cassette loader 40 according to the invention. It comprises a housing 41 capable of being light-tightly closed and enclosing a number of compartments are provided. Among these are the loading station 42, the dispensing station 43 and a station 44 in which the electric circuitry, wiring and power supplies are provided. Another compartment 45 is provided via which a pack of microfiche sheets may be introduced into the dispensing station 43. The loading station 42 and the dispensing station 43 communicate with each other via a slot 46 which during periods that no loading has to be performed is masked by means of a light screen 47 which may be brought either in operative or inoperative condition by means of an arm 48 upon partial rotation of the latter by master shaft 49.

In the loading station 42 is provided an inclined platform 50 having guides 51 and 52 showing the same profile as those provided in the screen 13 (see FIG. 1) so that the bottom 12 is capable to perform a lateral sliding into and out of the guides 51 and 52 and, consequently, into and out of the microfiche cassette loader 40.

The microfiche cassette is introduced into the microfiche loader 40 in opened condition. The cover 11 rests against a resiliently biased abutment member 53 which is capable to pivot around shaft 54. Around shaft 54 are provided spring means (not shown) which bias member 53 so as to return to the position as illustrated.

The opening angle and the inclined position of the cover 11 and the bottom 12 of the microfiche cassette are such that ample space is provided for permitting spadelike element or foot 55 to be located in close spaced proximity of the bottom 12 during the periods that a loading of the microfiche cassette has to take place.

The spade-like element 55 is suspended by means of a connecting member 56 from master shaft 49. The small clearance between the bottom 12 and the spade-like element acts as a guide channel 57 through which a sheet (not shown) is effectively guided in the grooves provided in the cassette bottom 12 (see again FIG. 1).

Part of the platform 50 is also resiliently displaceable (see further) in that an area of it may become substantially flush with the grooves in the bottom 12 in order to exclude the slightest misalignment of the loaded microfiche. The concerned part of the platform 50 is brought in operative position with the help of an eccentric 58 which displaces the part in question over a few millimeters.

When the loading cycle has come to an end, the spade-like element 55 is rotated (see arrow 59) in upward direction in order to assume a withdrawn position 55b as indicated in dotted lines. The rotation of master shaft 49 also racks the extremity of arm 48 to a lower position, thereby bringing light screen 47 over slot 46 and light-tightly closing the latter. At that moment, a mechanical impulse is given to the cover 11 of such a magnitude that the center of gravity of the cover 11 is shifted over the hinges 14, 15 so that closure of the cover 11 is accelerated. The momentum of the cover at the instant the bottom 12 is met, is sufficiently high to overcome the resistance of the spring-biased locking elements 19, 20 so that the latter may snap into their associated holes in the bottom, thereby locking the microfiche cassette.

The screen 13 (see FIG. 1 and further) is then positioned relative to the platform 50 so that the guides provided on the latter and in the screen are substantially in direct line of each other so that the cover 11 and the bottom 12, now locked together may be slid from the platform 50 to the screen 13, so that no risk exists for the microfiche to become fogged.

The working of the dispensing station 43 is illustrated and detailed in the further course of the description.

The dispensing station 43 and compartment 45 are separated from each other by a wall 60 in which an opening is provided which is light-tightly screened by means of a cover 61. When a pack of microfiches has to be placed in the dispensing station 43, the operator slips his hands via opening 62 in the side walls in which is provided a loosely hanging tapered sleeve 63 of light opaque material. Opening 64 of the tube 63 is provided with a rubber band which tightly fits around the wrists of the operator so that the protecting sleeve around the pack of microfiches may be safely removed and the open pack placed in the dispensing station 43 via the opening in wall 60, whereinafter the opening is closed by cover 61. In so doing, no danger exists that the contents of the dispensing station 43 would be inadvertently struck by ambient light.

Figure 3:
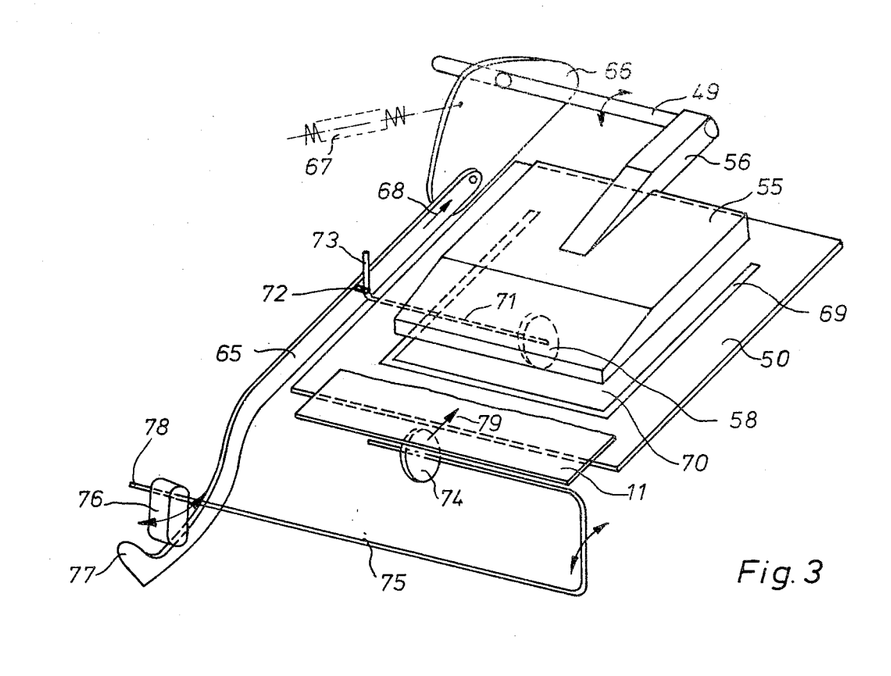
FIG. 3 shows more clearly the formation of the temporary guide.

In FIG. 3 is illustrated in more detail how the temporary guide, necessary for a reproducible feeding of a microfiche into the microfiche cassette, is formed.

The main constituents of the mechanism are formed by the platform 50 and the spade-like element 55 which is linked to master shaft 49 by means of connecting member 56. Master shaft 49 is pivoted by means of a slide bar 65 which upon longitudinal displacement imparts a rotating motion to arm 66 fixedly secured to master shaft 49. The arm 66 is resiliently biased by means of a spring 67 or analogous device, which biasing is such that master shaft 49 will tend to take such a position that the spade-like element 55 is kept in its uppermost direction. Upon displacing slide bar 65 in the direction of arrow 68 the spade-like element 55 assumes the working position as illustrated.

As may be seen, platform 50 is provided with a U-shaped groove 69 which defines a rectangular tongue-like part 70 which, due to the fact that one edge of it is integral with the platform 50, is capable to undergo small elastic deformations, i.e. flexing slightly, under the influence of eccentric 58 contacting its bottom side. The width of the rectangular tongue 70 is somewhat smaller than that of the opening 16 in bottom 12 of the cassette (see FIG. 1) so that when rectangular tongue 70 is urged upwardly by means of the eccentric 58, its forefront edge can assume a position which is substantially coincident with the groove 18 in the bottom 12 of the microfiche cassette. In so doing, a microfiche (not shown) being dispensed will always be directed such as to be positioned upon the peripheral groove 18 (see again FIG. 1) as any misalignment would be compensated by the upward deviation exerted by the part 70 in flexed position. The tongue 70 of the platform 50 is brought in upwardly flexed position with the help of eccentric 58 which exerts its driving force as a consequence of the partial rotation of shaft 71. This partial rotation is caused by the push exerted by rod 72 mounted on slide 65 upon the upwardly bent portion 73 of shaft 71 during the dispensing and loading cycles of the microfiche cassette loader.

As may also be derived from FIG. 3, the cover 11 (which is only partially show for the sake of clarity) rests against a support wheel 74 carried by a twice bent shaft 75. The latter bears at its other extremity a cam 76 which may be pivoted over a predetermined angle by the projection 77 on slide 65 during the longitudinal displacement of the latter. The mounting of cam 76 on shaft 75 occurs through the intermediary of a spring-element 78 which prevent that the rotation of cam 76 would involve a corresponding rotation of the shaft 75 when slide 65 advances in the direction indicated by arrow 68. During the returning movement of slide 65 after loading, however, when spade-like element 55 is moving upwardly, the rotation of cam 76 is transmitted to shaft 75 so that the support wheel 74 pushes the cover 11 of the microfiche cassette in the sense indicated by arrow 79. This pushing causes the center of gravity of the cover 11 to pass past the hinges of the microfiche cassette (see FIG. 2) so that the cover 11 acquires a momentum of growing magnitude when falling towards bottom 12. The magnitude of the momentum may become so high that it suffices for overcoming the biasing forces exerted upon the locks of the cover 11 (see FIG. 2) so that the locks 19, 20 snap in their corresponding holes 23, 24 and the microfiche cassette becomes locked. It will be clear from the foregoing that the loading and closing of the microfiche cassette may be carried out in a reliable position. It must be kept in mind that the mechanism as illustrated and described may be subjected to variations and that there may be devised a variety of equivalents for the parts and mechanisms involved.

Figure 4:
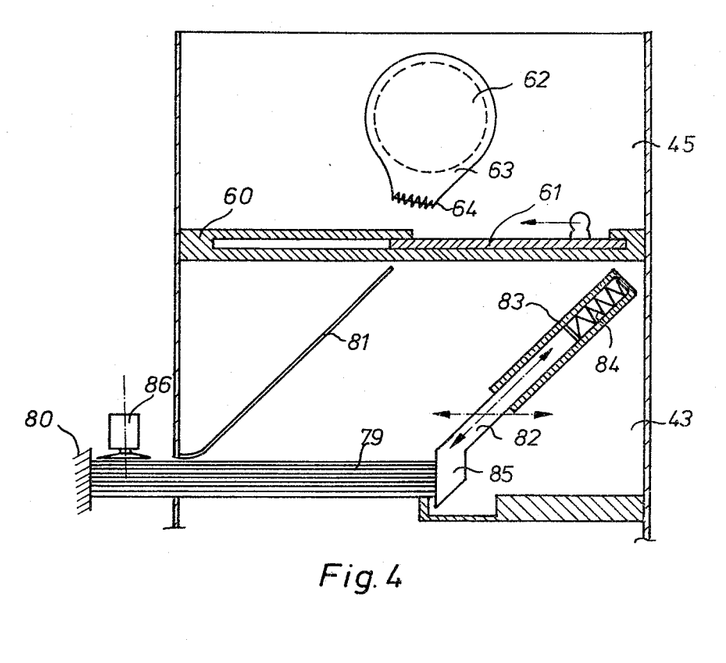
FIG. 4 gives a cross-sectional view of the microfiche storage station.

In FIG. 4 are illustrated the dispensing station 43 and compartment 45 via which a stack of microfiches is placed into the former. As the loading through opening 62 has already been described with reference to FIG. 2, the description of this cycle will not be repeated. The door 61 (in FIG. 2) has been replaced by one which is capable to be brought in light-screening position by a sliding movement. Within the dispensing station 43 is located a stack of microfiches 79 which abut against abutting member 80 for the purpose of proper alignment. The correct placing of the stack of microfiches 79 against abutting member 80 is greatly facilitated by the provision of downwardly directed guide 81 which guides the stack towards abutting member 80 in a reproducible way.

In order to keep the stack of microfiches 79 aligned in the course of the use of the loading device, a supplementary abutting member 82 is provided which is resiliently and displaceable mounted in a housing 83 under the influence of a spring 84. Due to the inclination of housing 83 and the consequent movement of abutting member 82, the protruding portion 85 of the latter remains in contact with the trailing edge of the stack 79 so that any misalignment is automatically compensated. The uppermost microfiche of the stack 79 is taken by means of a sucker-cup 86. The description of the complete dispensing cycle will follow hereinafter.

Figure 5:
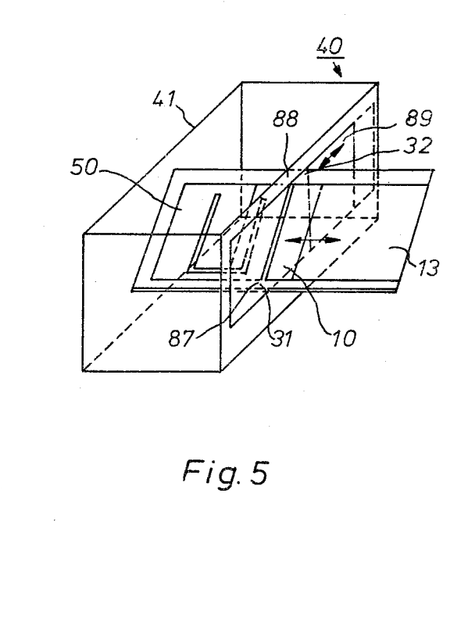
FIG. 5 shows how a microfiche cassette is introduced into the loading device.

FIG. 5 shows the general set up of the microfiche cassette loading device 40 according to the invention during the insertion of an empty cassette 10 prior to the loading or the withdrawal of the latter after the loading step. The screen 13 forming part of the microfiche cassette unit 10 is placed in mating relationship with platform 50 through the intermediary of profiles 31 and 32 which engage corresponding profiles 87, 88 on the platform 50. This permits the microfiche cassette cover and bottom to slide out of the screen 13 and to rest on the platform 50 between the guides 51 and 52 (see FIG. 2) which lie in the direct line of the corresponding guides 27, 28 in the screen (FIG. 1). Due to the fact that the mating of the screen 13 and the platform 50 occurs in intimate relationship parasitic light can be excluded from falling upon a microfiche (not shown) kept in the groove 18 in the bottom 12 of the microfiche cassette (see FIG. 1).

The interior of the housing 41 can be kept light-tight by means of a slidable door 89.

In FIGS. 6, 7, 8 and 9, finally, are represented the steps to be performed by the microfiche dispensing mechanism during one dispensing cycle.

The dispensing mechanism 90 essentially comprises an array of one or more sucker-cups 86 located above the stack of microfiches 79 in the vicinity of the leading edge of the latter. In case more than one sucker-cup 86 is provided, they are mounted on a common support which is positioned in parallel relationship with the leading edge of the microfiches constituting the stack.

The sucker-cup array is suspended from a suction tube 91 via which air can be aspirated when connected to a source of vacuum (not shown) which vacuum is transmitted via the suction tube 91 to the interior of each sucker cup 86. The suction tube 91 is freely suspended in a pair of arms 92 (one located at each side edge or longitudinal edge of the stack 79) which are fixedly secured to an associated lever 93. The set formed by the arm 92 and the lever 93 is pivotable around a spindle 94. The free extremity of lever 93 carries a small roller bearing 95 which rests against a rotating cam 96, the latter by the movement conferred to the lever 93 and arm 94, controlling the microfiche dispensing cycle. Apart from being suspended from the suction tube 91, the sucker-cup 86 is provided with a small roller 97 which rests against a cam 98. By the fact that the centers of the suction tube 91 and of the roller 97 do not coincide, the sucker-cup 86 is capable to perform small canting movements around the suction tube 91. The stack of microfiches 79 rests against an abutting member 80 as already explained. On top of the abutting member is fitted a knife 99, the purpose of which will be explained further.

In order to provide for a driving force for a dispensed microfiche towards the loading station (not shown) a plurality of transport rollers 100, 101, and 102 are provided.

Figures 6, 7:
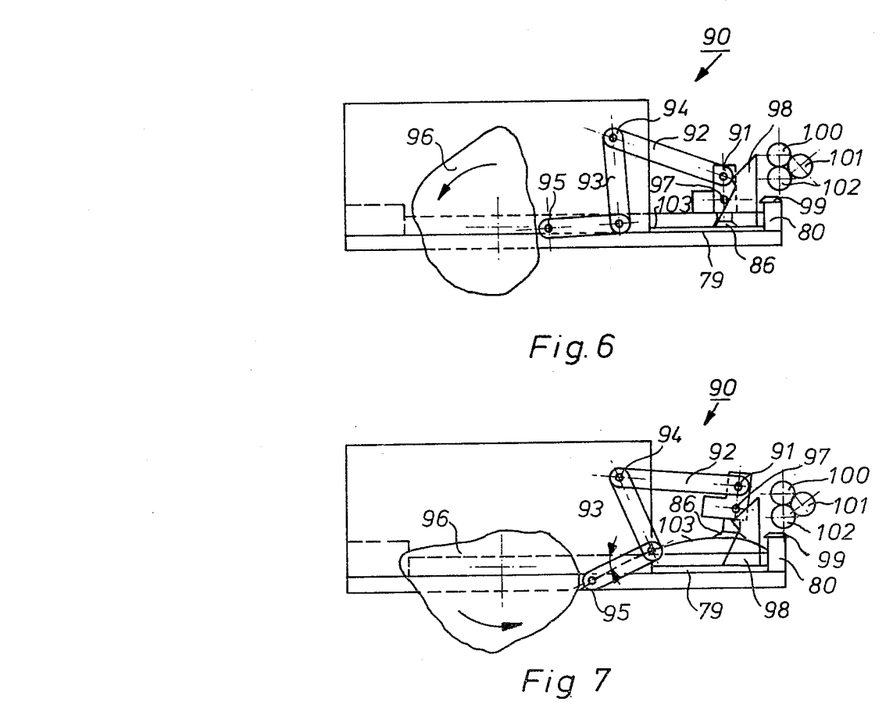
FIGS. 6 to 9 illustrate the consecutive steps necessary for dispensing a microfiche.

In FIG. 6 is illustrated the starting of the dispensing cycle. At that moment, the sucker-cup 86 takes hold of the uppermost sheet 103 of the stack of microfiches 79. Vacuum is applied to the interior of the sucker-cup 86. Even with the help of a slight underpressure, the surface of the uppermost sheet 103 firmly adheres to the suction mouth of the sucker-cup 86. The small roller 97 rests at the bottommost point of the inclined surface of cam 98.

In FIG. 7 is shown the situation after cam 96 has performed a quarter of one revolution. Due to the increased distance between the center of rotation of the cam 96 and the roller 95, the whole set formed by the arm 92 and the lever 93 has canted over an angle α so that as a consequence, the sucker-cup 86 is lifted and due to the inclined plane on cam 98 assumes a position which facilitates the separation from the uppermost sheet 103 from the rest of the stack 79. The uppermost sheet 103 assumes a concavely shaped configuration while being displaced in upward direction.

Figure 8:
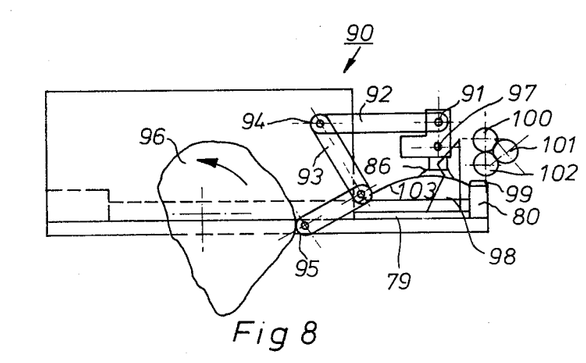

FIG. 8 shows the situation when the cam 96 has performed a 180 degrees rotation. At that moment, the leading edge of the uppermost sheet 103 reaches the knife 99 and is arrested by the latter during a small time lapse, which is however sufficiently long to permit any other microfiche sheet which by accident should stick to the uppermost one to become separated from the latter and to fall back on the stack again. Sticking of film sheets together may be caused by static electrification, the creation of a partial vacuum between adjacent sheets, etc. These phenomena are sufficiently known in the art and need therefore no further explanation. The presence of knife 99 serves the purpose of forcing a microfiche adhering to the uppermost one 103 to undergo a small displacement. This relative sliding of both sheets destroys any partial vacuum or slightly separates the sheets from each other so that the adhesion forces are lowered and are not sufficient anymore to carry the weight of the sheet which was taken from the stack by accident.

Figure 9:
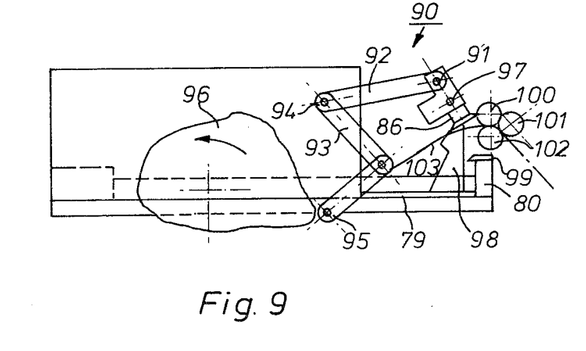

In FIG. 9 is illustrated the situation at the moment the uppermost sheet 103 is delivered to the transport roller unit 100, 101, and 102. At that moment, the unit formed by arm 92 and lever 93 has acquired the maximum swinging angle and the vacuum in the interior of the sucker cup 86 is released. The leading edge of the uppermost sheet 103 is consequently released and is taken in the nip of rollers 100 and 102 which direct it to the proper loading station. The loading cycle was described with reference to FIGS. 2 and 3.

We claim:

1. A device for loading in daylight conditions, a microfiche cassette of the type having a bottom, a cover hinged to said bottom and locking means therefor including spring loaded detents snapable into associated recesses, comprising:
   a housing
   a door in said housing capable of being opened and closed and when closed light-tightly shielding light from the interior of said housing
   a space in said housing in which a stack of unexposed microfiches may be housed in darkroom conditions
   a platform in said housing for supporting said microfiche cassette in said housing in unlocked and opened condition for receiving a microfiche on one of said bottom or cover
   guiding means movable between a withdrawn inoperative position and operative position proximate the part of the cassette receiving the microfiche to form a temporary guide channel for the microfiche being delivered as the latter approaches said platform so that the microfiche assumes a predetermined position on the part receiving it and
   means for the closing and relocking of said microfiche cassette after loading with said microfiche.

2. A device according to claim 1, in which said platform is mounted in inclined position.

3. A device according to claim 1, in which said temporary guide is formed by a spade-like foot which is positioned parallel with said cassette part in said operative position.

4. A device according to claim 3, in which the distance between said spade-like foot and said cassette part amounts generally to between 1 and 3 mm.

5. A device according to claim 3, in which said cassette part has an opening therein which is adapted to be closed when the cassette is removing from the loading device and including a flexible tongue disposed along the opposite side of said part from said guide foot and means for flexing said tongue to an operative position projecting into said opening with its leading edge lying substantially flush with the upper surface of the cassette part receiving said microfiche.

6. A device according to claim 5, in which said flexible tongue is brought into operative position with the help of an eccentric.

7. A device according to claim 1, in which when said cassette is in open supported position on said platform, the open part thereof is above the supported part and said means for closing and relocking said microfiche cassette comprise a mechanism imparting a mechanical impulse to the open part, the latter as a consequence performing a pivoting motion around the cassette hinges.

8. A device according to claim 7, in which said mechanical impulse has such an amplitude as to impart a momentum to the open part which is sufficiently high to overcome the biasing force exerted upon the cassette locks which as a consequence snap into their associated holes, thereby relocking the cassette.

9. A device according to claim 1, in which said space in which said stack of unexposed microfiches is stored is closed by a retractable light screen when said device is in inoperative condition.

10. A device according to claim 1, in which said means to take hold of the uppermost one of said stack of microfiches comprises a cam controlled sucker-cup capable of gripping a microfiche when vacuum is applied to the interior of said sucker-cup.

* * * * *